United States Patent
Kodialam et al.

[19]

[11] Patent Number: 5,923,742
[45] Date of Patent: Jul. 13, 1999

[54] SYSTEM AND METHOD FOR DETECTING MASS ADDRESSING EVENTS

[75] Inventors: Muralidharan Kodialam, Edison; Donald Jay Mintz, Fair Haven, both of N.J.

[73] Assignee: AT&T Grp., Middletown, N.J.

[21] Appl. No.: 08/800,796

[22] Filed: Feb. 14, 1997

[51] Int. Cl.$^6$ ............................................. H04M 15/00
[52] U.S. Cl. ..................... 379/133; 379/113; 379/134; 379/137
[58] Field of Search ........................ 379/34, 111, 112, 379/113, 115, 133, 134, 137, 138, 139, 140, 219

[56] References Cited

U.S. PATENT DOCUMENTS

| | | | |
|---|---|---|---|
| 3,560,658 | 2/1971 | Molly et al. | 379/137 |
| 5,042,064 | 8/1991 | Chung et al. | 379/113 |
| 5,295,183 | 3/1994 | Langlois et al. | 379/113 |
| 5,450,483 | 9/1995 | Williams | 379/279 |
| 5,537,611 | 7/1996 | Rajagpal et al. | 379/221 |
| 5,778,057 | 7/1998 | Atai | 379/134 |
| 5,825,769 | 10/1998 | O'Reilly et al. | 379/113 |
| 5,828,729 | 10/1998 | Clermont et al. | 379/34 |

*Primary Examiner*—Curtis A. Kuntz
*Assistant Examiner*—Binh K. Tieu

[57] ABSTRACT

A system and method for detecting mass addressing events comprising a first register, a second register, a first counter, and a second counter is disclosed. Potential mass addressing events are detected by comparing a most recently selected address to the contents of the first register and incrementing the first counter if they are equal, or loading the most recently selected address into the first register and initializing the first counter if they are unequal. If the first counter's count reaches a first count threshold, the contents of the first register are compared to the contents of the second register and the second counter is incremented if they are equal, or, if they are unequal, the contents of the first register are loaded into the second register and the second counter is initialized. If the second counter's count reaches a second count threshold, an alarm is issued. In an alternative preferred embodiment, the first and second registers and the first and second counters are periodically reset to reduce false mass addressing event alarms.

43 Claims, 2 Drawing Sheets

SYSTEM AND METHOD FOR DETECTING MASS ADDRESSING EVENTS

BACKGROUND OF THE INVENTION

This invention relates to detecting mass addressing events. Examples of systems that can make use of this invention are telephone networks, addressable memory devices, data bus systems, and the like.

The detecting aspect of the invention relates to alerting a monitoring station of potential mass addressing events before such events happen. Such an aspect is particularly well suited for telephone networks wherein mass addressing events (within the telephone industry an "addressing event" being the dialing of a telephone number) can result in an enormous amount of non-revenue generating work for telephone service providers. Further, such overloads cause network instability by not only reducing throughput at a specific network element, but by also stressing the signaling network, databases, switches, and trunking network all at the same time.

The terms "mass addressing event" and "mass calling event" or the like are used herein to refer to addressing or calling events of sufficient magnitude to overload, overwhelm, shutdown, or damage conventional address routing circuitry. Telephone switching equipment, for example, often contains overload protection circuitry which will disable (e.g., shut down) individual switching devices if call volume exceeds a certain threshold rather than allowing switches to be damaged.

A mass calling event may be alternatively defined as a calling volume in excess of customer answering capability. Only very large telephone service customers are capable of answering more than 15 to 20 calls per second, most customers having substantially reduced capabilities. As such, call volumes in excess of 15–20 calls per second, while usually insufficient to overwhelm network switching circuitry, may nonetheless far exceed customer capability. Any calls in excess of customer capability go unanswered and cannot therefore be billed by telephone service providers (i.e., are non-revenue generating calls which reduce network throughput) and may be considered a form of mass calling event.

A classic example of a mass addressing event occurred during an episode of the television series Melrose Place when the viewing audience was invited to call a displayed telephone number to qualify for a chance to appear on a future episode. Switching networks received an estimated 20,000 calls per second in response to this promotion. Because of this calling volume, most attempted calls were uncompleted (as calling volume far exceeded customer answering capability), causing telephone service providers lost revenues. In general, during mass calling events of this nature, most attempted calls are uncompleted, necessarily reducing telephone service provider profits. Furthermore, such mass calling events may prompt switching network protection circuitry to shut down switching devices (to prevent the devices from being damaged), resulting in substantially reduced network capacity for all network customers (further reducing revenues to telephone service providers and fostering customer ill will). Clearly, from both a customer satisfaction viewpoint and a telephone service provider revenue viewpoint, mass addressing events are undesirable.

Conventional techniques for monitoring telephone networks and rerouting high calling volumes are not well suited for handling mass calling events. For example, U.S. Pat. No. 5,537,611 to Rajagopal et al. (hereinafter "the '611 patent") discloses using a database to collect and process traffic and routing statistics for special call processing services such as 800, 900, EVS, or VNET. Calling volumes can be monitored and alarms issued if calling volume exceeds preset thresholds within a one minute time interval. While the database disclosed in the '611 patent is well suited for dedicated networks with small calling volumes (calling volumes in the 4,000 to 5,000 calls per hour range are discussed, though the '611 patent indicates that an alarm threshold can be set between 1 and 65,000 calls per minute), such database systems are impractical for handling the calling volume (up to 20,000 calls per second or 1,200,000 calls per minute) experienced by a large telephone network during a mass calling event. The processing power and memory requirements needed to keep statistics on, to search through, and to update a database with so many telephone numbers makes use of the '611 patent's database impracticable during mass calling events.

One technique which can be adapted for handling mass calling events is disclosed in U.S. Pat. No. 5,450,483 to Williams (hereinafter "the '483 patent"). The '483 patent teaches a method of controlling overloads in a telephone network by monitoring the number of failed calls to a node and restricting calling volume to that node once a threshold level of failed calls is reached. However, the system disclosed in the '483 patent detects network overloads which have already occurred. As such, a telephone monitoring station (e.g., a Network Operations Center which monitors and controls network operations) employing the '483 system cannot take measures which will prevent a network from overloading. By the time the '483 system detects an overload, customers are already dissatisfied, revenues are already lost, and switching components may have already shutdown.

A need therefore exists for a system and method which allows potential mass addressing events to be identified so that preventative measures (which will reduce or eliminate the number of failed addressing attempts) may be undertaken. Within the telephone industry, such a system will substantially increase customer satisfaction by reducing failed calling volume and increase telephone service provider profitability by decreasing non-revenue generating calls (e.g., uncompleted, non-billable telephone calls).

It is therefore an object of this invention to provide an improved method of detecting mass addressing events.

It is a more particular object of this invention to detect potential mass addressing events and to alert a monitoring station of such potential events so that corrective measures may be taken prior to address routing circuitry (e.g., telephone network switches) overloading.

SUMMARY OF THE INVENTION

These and other objects of the invention are accomplished in accordance with the principles of the invention by providing a system and method for detecting potential mass addressing events. A most recently selected address (such as a most recently dialed telephone number) is compared to the contents of a first register. If the most recently selected address is the same as the address stored in the first register, a first counter is incremented. However, if the most recently selected address is not the same as the address stored in the first register, the most recently selected address is loaded into the first register and the first counter is initialized (e.g., set to one). A new most recently selected address (e.g., the next telephone number dialed) is then obtained and the above process is repeated. In this manner, the first counter counts the number of times the same address is consecutively selected. If this number reaches a predetermined first count threshold K1 (i.e., if the first counter's count equals or exceeds the first count threshold K1) then a first warning signal is generated to indicated that the first threshold value has been reached (i.e., an address has been consecutively selected K1 times) and the first register and the first counter are reset (e.g., set to zero). Accordingly, a first warning signal is generated each time any address is consecutively selected at least K1 times. This first warning signal ay be used to alert a monitoring station of a potential mass addressing event and may include the identity of the consecutively selected address responsible for the generation of the first warning signal. The monitoring station may respond manually or automatically to the first warning signal, and the first count threshold K1 may remain constant or vary dynamically.

In another aspect of the present invention, the first register and the first counter are not reset immediately after the first warning signal is issued. Instead, the first warning signal causes the contents of the first register to be compared to the contents of a second register. If the contents of the first register are the same as the contents of the second register, a second counter is incremented and the first register and the first counter are reset. However, if the contents of the first register are not the same as the contents of the second register, then the contents of the first register are loaded into the contents of the second register, the first register and the first counter are reset, and the second counter is initialized. In this manner, the second counter counts the number of consecutive times the first warning signal has been generated for the same selected address. If this number reaches a predetermined second count threshold K2 (i.e., if the second counter's count equals or exceeds the second count threshold K2) then a second warning signal is generated. The second register and the second counter are then reset. Accordingly, a second warning signal is generated each time any address is selected K1 times in a row on K2 separate occasions. That is, a second warning signal is generated after K2 consecutive "bursts" of the same address have occurred, each "burst" consisting of the same address being consecutively selected K1 times. As with the first warning signal, the second warning signal may be used to alert a monitoring station of a potential mass addressing event.

By having two independently controllable threshold values (e.g., the count threshold K1 and K2 may be software programmable), the likelihood of false mass addressing event warnings is substantially reduced. Any number of register/counter stages (i.e., register/counter stages similar to the second register and second counter discussed above) can be used to further reduce false mass addressing event warnings.

In another aspect of the present invention, the first register, the first counter, the second register, and the second counter are periodically reset to further reduce the likelihood of false mass addressing event warnings. Each may be reset at a unique time (asynchronously), or all may be reset simultaneously (synchronously).

Further features of the invention, its nature and various advantages, will be more apparent from the accompanying drawings and the following detailed description of the preferred embodiments.

DETAILED DESCRIPTION OF THE PREFERRED EMBODIMENTS

Figure 1:
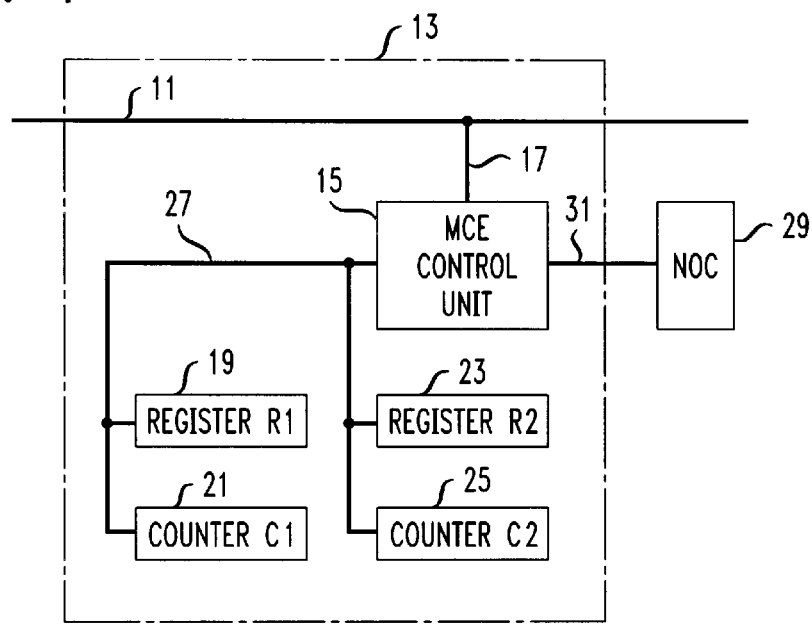
FIG. 1 is a block diagram of an illustrative apparatus which can operate in accordance with this invention.

In the illustrative embodiment shown in FIG. 1 a plurality of routing lines 11 are operatively coupled to a telephone network node 13. Routing lines 11 may, for example, comprise coaxial cables, optical fiber bundles, or microwave links, and network node 13 may comprise a trunk exchange switch node, a local exchange switch node, a special service switch node, some form of mobile telecommunications network, or the like. Further contained within network node 13 is hardware used in a preferred embodiment of the present invention; namely, a mass calling event control unit 15 (hereinafter "MCE control unit 15") operatively coupled to routing lines 11 via a plurality of query bus lines 17 (hereinafter query bus 17) and further operatively coupled to a first register 19 (register R1), a first counter 21 (counter C1), a second register 23 (register R2), and a second counter 25 (counter C2) via a control bus 27. MCE control unit 15 is also operatively coupled to a Network Operations Center 29 through a warning bus 31. It will be understood that these examples are only illustrative, and that many other configurations for routing lines 11, network node 13, and the MCE hardware (i.e., MCE control unit 15, first register 19, first counter 21, second register 23, and second counter 25) are possible.

In operation, to initiate mass calling event detection, MCE control unit 15 resets first register 19, first counter 21, second register 23, and second counter 25 to zero (though any initial values may be used). Subsequently, by means of query bus 17, MCE control unit 15 queries routing lines 11 to obtain, among other things, the most recently dialed telephone number (hereinafter "MRDTN") which is present at network node 13. If the MRDTN is equal to the contents of first register 19, first counter 21 is incremented; otherwise, the MRDTN is loaded into first register 19 and first counter 21 is initialized (e.g., set to one). These steps are repeated continuously: MCE control unit 15 queries routing lines 11 to get a MRDTN, compares this MRDTN to the contents of first register 19 and increments first counter 21 if they are equal, or loads first register 19 with the MRDTN and initializes first counter 21 if they are unequal. In this manner, first counter 21 counts the number of consecutive times (i.e., the number of times in a row) the same telephone number is dialed to network node 13.

In addition, MCE control unit 15 monitors first counter 21's count and determines if it equals or exceeds a first count threshold K1. Once first counter 21's count equals or exceeds threshold K1, MCE control unit 15 either issues a first alarm signal to Network Operations Center 29 via warning bus 31 (alerting Network Operations Center 29 of a potential mass calling event and preferably containing the telephone number responsible for the alarm condition), or in a preferred embodiment, compares the contents of second register 23 to the contents of first register 19. If the contents of second register 23 are the same as the contents of first register 19, MCE control unit 15 increments second counter 25. If the contents of second register 23 and first register 19 are not the same, MCE control unit 15 loads the contents of first register 19 into second register 23, resets first register 19 and first counter 21 to zero, and initializes second counter 25. MCE control unit 15 then returns to querying routing lines 11 for the new MRDTNs. While registers and counters are reset to zero and initialized to one in a preferred embodiment, other reset and initial values may be used.

In addition to monitoring first counter 21, MCE control unit 15 also monitors second counter 25. If second counter 25's count reaches a second count threshold K2, MCE control unit 15 issues a second alarm signal (which preferably contains the telephone number responsible for the alarm condition) to Network Operations Center 29 via warning bus 31, resets second register 23 and second counter 25 to zero and then continues querying routing lines 11 for new MRDTNs.

In the preferred embodiment therefore, a two stage mass calling event detection circuit is provided which warns a Network Operations Center of potential mass calling events. By adjusting threshold values K1 and K2, false mass calling event alarms can be minimized while still maintaining sufficient mass calling event protection. For example, if the mass calling event detection circuit is required to detect a telephone number that is responsible for 50% of the calling traffic during a mass calling event, K1 and K2 are set high to avoid false mass calling event alarms. If, on the other hand, the mass calling event detection circuit is required to detect a telephone number that is responsible for 10% of the calling traffic during a mass calling event, K1 and K2 are set low to ensure that mass calling events do not go undetected.

In another aspect of a preferred embodiment, MCE control unit 15 automatically resets first register 19, first counter 21, first register 23, and first register 25 to zero at a periodic reset time K0 (though each could be reset at different times, or not at all). As with count thresholds K1 and K2, periodic reset time K0 helps reduce false mass calling events alarms. For example, if first count threshold K1 is set to 4 and second count threshold K2 is set to 2, a mass calling event alarm will be issued if the same telephone number is detected 4 times in a row on 2 separate occasions (assuming second counter 25 is not reset prior to the 2 separate occasions because of a different telephone number being dialed 4 times in a row). Without more information, Network Operations Center 29 will be unaware of the time period during which the calls responsible for the MCE alarm occurred (e.g., per second, per hour, per day, per week, etc.). A mass calling event alarm could be issued even though the calls occurred at a rate well within normal network traffic rates. By periodically resetting first register 19, first counter 21, first register 23, and first register 25, Network Operations Center 29 will know, at a minimum, that the calls responsible for the MCE alarm occurred within one periodic reset time K0 (be it a minute, an hour, a day, etc.). As such, periodic resetting reduces false mass calling event alarms, whether used independently of or in cooperation with count thresholds K1 and K2.

With regard to the selection of count thresholds K1 and K2 and periodic reset time K0 for mass calling event detection, factors such as the fraction of traffic from a given telephone number, p, and the total traffic rate, $\lambda$ (e.g., the number of telephone calls per second), must be considered. For example, the time to detection $t_d$ (e.g., time required for a mass calling event alarm to be generated) is approximately related to detection probability $\epsilon$, by:

$$t_d = -\frac{K2! \cdot \log \epsilon}{K0^{K2-1} \cdot \lambda^{K2} \cdot p^{K1 \cdot K2}}$$

(Note that this formula is only an approximation. A more accurate measure of $t_d$ requires computer simulation.) From the above formula it is clear that time to detection $t_d$ can be optimized by making periodic reset time K0 large while keeping count thresholds K1 and K2 small. However, increasing periodic reset time K0 and decreasing count thresholds K1 and K2 also increases the probability of a false mass calling event alarm being issued. The desire for fast mass calling event detection must therefore be balanced with the need for accurate mass calling event detection.

Figure 2:
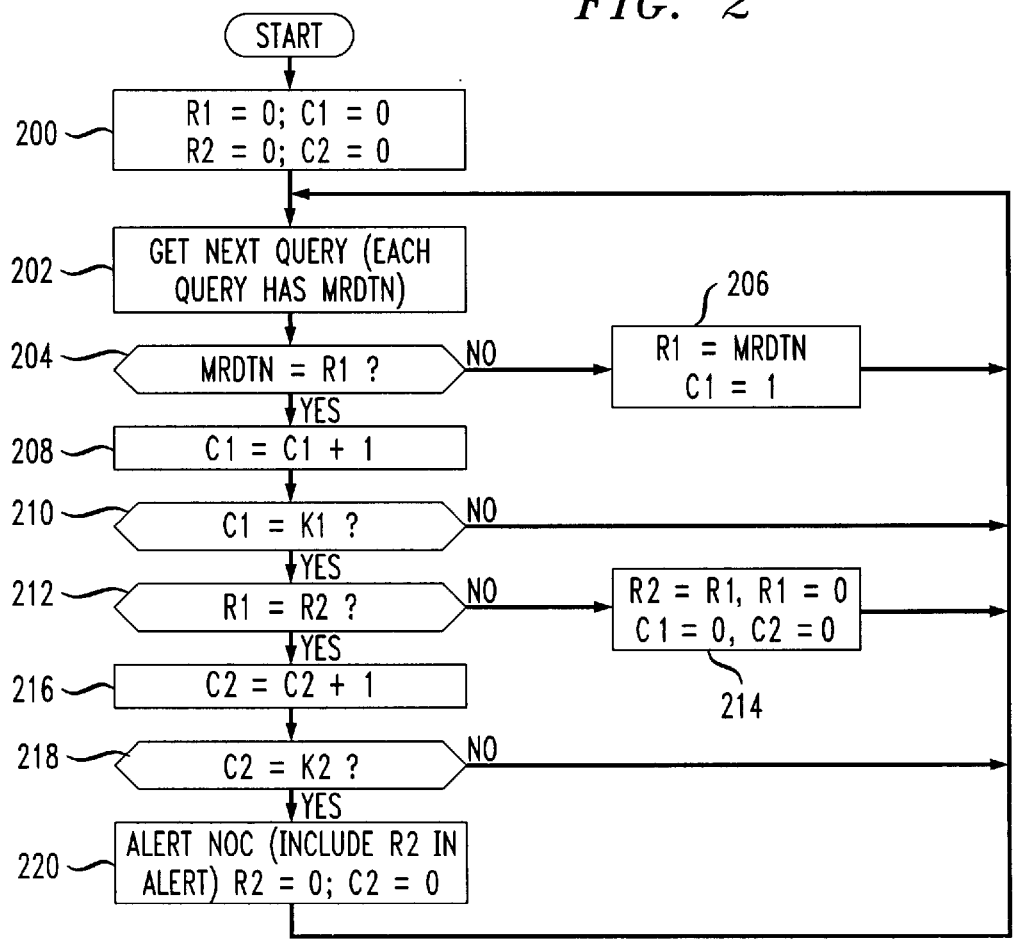
FIG. 2 is a flow chart useful in describing the operation of an illustrative embodiment of the invention.

FIG. 2 shows an illustrative sequence of steps in accordance with the invention for operating the apparatus of FIG. 1 as described above or, more generally, for use in a software embodiment of the present invention. To some extent these steps have already been mentioned and the discussion of them here can be somewhat abbreviated.

In step 200 registers R1 and R2 and counters C1 and C2 are reset. Registers R1 and R2 may, for example, be equivalent to first register 19 and second register 23 of FIG. 1, respectively, while counters C1 and C2 may be equivalent to first counter 21 and second counter 25 of FIG. 1, respectively. Normally R1, R2, C1, and C2 are reset to zero, though other starting values may be used.

In step 202 a query is made to determine the MRDTN present at the network node.

In step 204 the contents of register R1 are compared to the MRDTN. If the MRDTN is the same as the contents of register R1, then control passes to step 208 (described below); otherwise control passes to step 206 wherein the MRDTN is stored in register R1, counter C1 is initialized (e.g., set to one), and control passes back to step 202 wherein a new MRDTN is obtained and the above mentioned steps are repeated.

In step 208 (recalling that control passed to step 208 when, in step 204, the MRDTN was found to be the same as the contents of register R1) counter C1 is incremented (e.g., increased by one), indicating that the MRDTN is the same telephone number as is contained in register R1. Control then passes to step 210.

In step 210, counter C1 is compared to a first count threshold K1. If counter C1's count is not equal to or greater than count threshold K1, control passes to step 202; otherwise, control passes to step 212.

In step 212, the contents of register R1 are compared to the contents of register R2. If the contents of register R1 are the same as the contents of register R2, control passes to step 216 (described below); otherwise, control passes to step 214.

In step 214, the contents of register R1 are loaded into register R2 and register R1 and counter C1 are reset (e.g., set to zero). Counter C2 is also initialized (e.g., set to 1). Control then passes to step 202.

In step 216 (recalling that control passed to step 216 when, in step 212, the contents of register R1 were determined to be the same as the contents of register R2) counter C2 is incremented (e.g., increased by one). Control then passes to step 218.

In step 218 counter C2 is compared to a second count threshold K2. If counter C2's count is not equal to count threshold K2, control passes to step 202; otherwise, control passes to step 220.

In step 220 an alarm is issued, which in the preferred embodiment contains the contents of register R2 (i.e., the MRDTN responsible for the alarm), to a monitoring station (e.g., Network Operations Center 29). Register R2 and counter C2 are then reset (e.g., set to zero) and control is passed to step 202.

As described with regard to FIG. 1, registers R1 and R2 and counters C1 and C2 are preferably periodically reset (e.g., set to zero) every K0 seconds to reduce false MCE alarms. In one preferred embodiment, the resetting of registers R1 and R2 and counter C1 and C2 is achieved by adding a timer T1 which is started in step 206 of FIG. 2 and stopped (and reset to zero) in step 200. An additional step 203 is added which determines if timer T1 has counted K0 seconds, and if so, passes control to step 200 wherein register R1 and R2 and counters C1 and C2 are reset to zero and wherein timer T1 is stopped and reset to zero, otherwise step 203 passes control to step 202 wherein a new MRDTN is obtained. Furthermore, steps 210, 214, 218, and 220 are configured to pass control to step 203 rather than step 202 as previously described.

Figure 3:
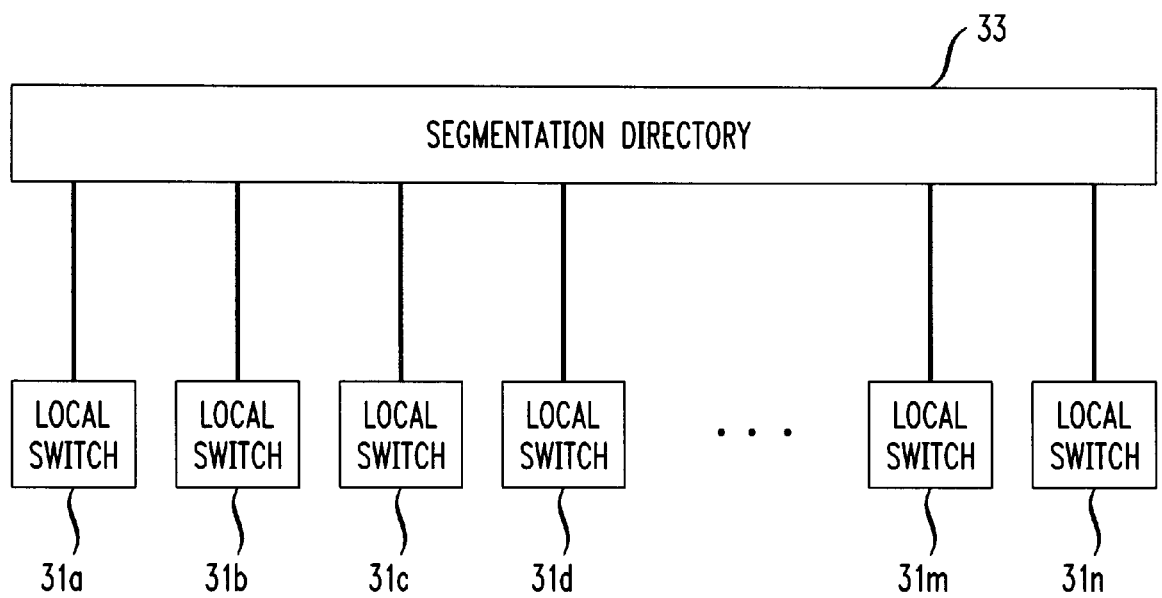
FIG. 3 is a block diagram of a telephone network employing an embodiment of the present invention.

The system and method of the present invention is particularly well suited for use in the segmentation directories being introduced to AT&T's long distance network. FIG. 3 shows a plurality of local switches 31a–31n coupled to a segmentation directory 33. Although FIG. 3 shows only 14 local switches (switches 31a–31n), it is understood that any number may be used. The local switches 31 represent local AT&T switching nodes scattered throughout the United States and provide access/egress for calls entering/leaving AT&T's long distance network. For example, if a caller picks up a telephone in Manhattan and dials a San Francisco telephone number, the local telephone service provider (e.g., NYNEX) determines what long distance carrier (e.g., AT&T, MCI, Sprint, etc.) is being used. If AT&T is the long distance carrier, the dialed telephone number is routed to local switch 31m in Manhattan (assuming local switch 31m is located in Manhattan) where its addressing information is interpreted.

Every telephone number entering the AT&T's long distance network (through local switches 31a–31n) is fed to segmentation directory 33. Although FIG. 3 shows only one segmentation directory, it is understood that any number may be used. Segmentation directory 33 serves as a location at which every telephone call entering AT&T's long distance network may be examined. Because segmentation directory 33 examines every call entering AT&T's long distance network, it is an ideal location for monitoring mass calling events. As such, in a preferred embodiment, registers R1 and R2 and counters C1 and C2 of FIG. 2 are located within segmentation directory 33. If a mass calling event is detected at segmentation directing 33, calling volume at local switches 31a–31n may be automatically controlled or manually controlled by a Network Operations Center. Calling volume may be reduced or blocked by techniques well known in the art.

It will be understood that the foregoing is only illustrative of the principles of the invention and that various modifications can be made by those skilled in the art without departing from the scope and spirit of the invention. For example, the invention can be used at any type of network switching node and can detect small scale mass calling events, such as the calling volume to a local switching network in response to a local radio station promotion.

Furthermore, the present invention is well suited for detecting mass addressing events which may occur on the INTERNET or the WORLD WIDE WEB, during requests for access to data or a data bus, or during any similar addressing event.

The invention may be used with many different types of registers R1 and R2 and counters C1 and C2 and may be embodied in hardware, software, or any combination thereof.

The invention claimed is:

1. A method for detecting a potential mass addressing events comprising:
   (a) obtaining a most recently selected address;
   (b) comparing said selected address to contents of a first storage element;
   (c) incrementing a first counting element if said selected address is equal to said contents of said first storage element, otherwise initializing said first counting element and loading said first storage element with said selected address; and
   (d) generating a first warning signal if said first counting element equals a first predetermined value.

2. The method defined in claim 1 wherein said selected address is a dialed telephone number.

3. The method defined in claim 1, further comprising:
   resetting said first counting element after generating said first warning signal.

4. The method defined in claim 1, further comprising:
   resetting said first storage element after generating said first warning signal.

5. The method defined in claim 1, further comprising:
   resetting said first storage element and said first counting element prior to obtaining said selected address.

6. The method defined in claim 1, wherein said first warning signal includes an identity of said selected address.

7. The method defined in claim 1, further comprising:
   alerting a monitoring station of said first warning signal.

8. The method defined in claim 7 wherein said monitoring station is a Network Operations Center.

9. The method defined in claim 1 wherein said first counting element is reset after a predetermined time.

10. The method defined in claim 1 wherein said first storage element is reset after a predetermined time.

11. The method defined in claim 1 wherein said first counting element and said first storage element are both reset after a predetermined time.

12. The method defined in claim 11 further comprising:
    repeating steps (a)–(d).

13. The method defined in claim 1, further comprising:
    (e) comparing the contents of said first storage element to contents of a second storage element in response to said first warning signal;
    (f) incrementing a second counting element if said contents of said first storage element are equal to said contents of said second storage element, otherwise initializing said second counting element and loading said second storage element with said contents of said first storage element; and
    (g) generating a second warning signal if said second counting element equals a second predetermined value.

14. The method defined in claim 13, further comprising:
    resetting said second counting element after generating said second warning signal.

15. The method defined in claim 13, further comprising:
    resetting said second storage element after generating said second warning signal.

16. The method defined in claim 13, wherein said second warning signal includes an identity of said selected address.

17. The method defined in claim 13, further comprising:
    alerting a monitoring station of said second warning signal.

18. The method defined in claim 17 wherein said monitoring station is a Network Operations Center.

19. The method defined in claim 13, further comprising:
    repeating steps (a)–(g).

20. The method defined in claim 13 wherein said first counting element is reset after a predetermined time.

21. The method defined in claim 13 wherein said first storage element is reset after a predetermined time.

22. The method defined in claim 13 wherein said second counting element is reset after a predetermined time.

23. The method defined in claim 13 wherein said second storage element is reset after a predetermined time.

24. The method defined in claim 13 wherein said first counting element, said first storage element, said second counting element, and said second storage element are reset after a predetermined time.

25. An apparatus for detecting a mass calling events comprising:

a first counter;

a first register;

means for determining whether contents of said first register are equal to a most recently selected address, and if so, incrementing said first counter, otherwise initializing said first counter and storing said selected address in said first register; and means for determining whether said first counter has reached a first predetermined value, and if so, generating a first warning signal.

26. The apparatus defined in claim 25 wherein said selected address is a dialed telephone number.

27. The apparatus defined in claim 25 further comprising:

means for resetting said first counter following said first warning signal being generated.

28. The apparatus defined in claim 25 further comprising:

means for resetting said first register following said first warning signal being generated.

29. The apparatus defined in claim 25 further comprising:

means for alerting a monitoring station of said first warning signal.

30. The apparatus defined in claim 29 wherein said monitoring station is a Network Operations Center.

31. The apparatus defined in claim 25 further comprising:

means for resetting said first counter after a predetermined time.

32. The apparatus defined in claim 25 further comprising:

means for resetting said first register after a predetermined time.

33. The apparatus defined in claim 25 further comprising:

means for resetting said first counter and said first register after a predetermined time.

34. The apparatus defined in claim 25, further comprising:

a second counter;

a second register;

means for comparing the contents of said first register to contents of said second register in response to said first warning signal;

means for incrementing said second counter if said contents of said first register are equal to said contents of said second register, otherwise initializing said second counter and storing the contents of said first register in said second register; and means for determining if said second counter equals a second predetermined value, and if so, generating a second warning signal.

35. The apparatus defined in claim 34 further comprising:

means for resetting said second counter following said second warning signal being generated.

36. The apparatus defined in claim 34 further comprising:

means for resetting said second register following said second warning signal being generated.

37. The apparatus defined in claim 34 further comprising:

means for alerting a monitoring station of said second warning signal.

38. The apparatus defined in claim 37 wherein said monitoring station is a Network Operations Center.

39. The apparatus defined in claim 34 further comprising:

means for resetting said first counter after a predetermined time.

40. The apparatus defined in claim 34 further comprising:

means for resetting said first register after a predetermined time.

41. The apparatus defined in claim 34 further comprising:

means for resetting said second counter after a predetermined time.

42. The apparatus defined in claim 34 further comprising:

means for resetting said second register after a predetermined time.

43. The apparatus defined in claim 34 further comprising:

means for resetting said first counter, said first register, said second counter, and said second register after a predetermined time.

* * * * *